(12) United States Patent
Yaqub

(10) Patent No.: US 7,729,327 B2
(45) Date of Patent: Jun. 1, 2010

(54) DYNAMIC USE OF MULTIPLE IP NETWORK INTERFACES IN MOBILE DEVICES FOR PACKET LOSS PREVENTION AND BANDWIDTH ENHANCEMENT

(75) Inventor: Raziq Yaqub, Stewartsville, NJ (US)

(73) Assignees: Toshiba America Research, Inc., Piscataway; Telcordia Technologies, Inc., Piscataway ( * ) Notice: Subject to any disclaimer, the term of this patent is extended or adjusted under 35 U.S.C. 154(b) by 535 days.

(21) Appl. No.: 11/531,814

(22) Filed: Sep. 14, 2006

(65) Prior Publication Data

US 2007/0140256 A1    Jun. 21, 2007

(51) Int. Cl.
*H04W 4/00* (2009.01)
*H04M 1/00* (2006.01)
*H04L 12/28* (2006.01)

(52) U.S. Cl. ............... 370/338; 370/395.5; 370/332; 455/574

(58) Field of Classification Search ........... 370/395.5, 370/332
See application file for complete search history.

(56) References Cited

U.S. PATENT DOCUMENTS

| | | | | |
|---|---|---|---|---|
| 6,564,042 | B1 * | 5/2003 | Jou et al. ............... | 455/238.1 |
| 6,618,596 | B1 * | 9/2003 | Uchida .................. | 455/522 |
| 7,020,472 | B2 * | 3/2006 | Schmidt ................. | 455/450 |
| 2004/0106441 | A1 * | 6/2004 | Kazakevich et al. ..... | 455/574 |
| 2004/0218575 | A1 * | 11/2004 | Ibe et al. .............. | 370/338 |
| 2005/0068982 | A1 * | 3/2005 | Guo et al. ............. | 370/468 |
| 2005/0266852 | A1 * | 12/2005 | Kitamura .............. | 455/437 |

OTHER PUBLICATIONS

D. Johnson, "Mobility support in IPv6. Request for Comments (Standards Track) 3775", Internet Engineering Task Force, Jun. 2004, pp. 1-129, USA.
R. Wakikawai, "multiple Care-of Address Registration", Internet Draft, May 2008 p. 1-44, MEXT Working Group, USA.
B.Henty, "Throughput Measurements and Empirical Prediction Models for IEEE 802.11b Wireless LAN (WLAN) Installations", Techical Report MPRG Jan. 2008, Dept. of Electrical and Computer Engineering, Aug. 2001, Virginia Polytechnic Institute and State University, Blacksburg, VA.

* cited by examiner

*Primary Examiner*—Lester Kincaid
*Assistant Examiner*—Yu (Andy) Gu
(74) *Attorney, Agent, or Firm*—Watch Stone P+D, PLLC (57) ABSTRACT

The particular status of a Multiple Network Interface Mobile Device (MID) is identified and particular problems associated with that status are addressed by activating different modes of operation depending upon whether the MID is stationary or in motion. In particular, when the mobile device is in motion, the multiple network interfaces are used to prevent packet loss, and when the mobile device becomes stationary, the multiple network interfaces are used to enhance bandwidth to achieve superior Quality of Service (QoS). MIDs thus are allowed to utilize multiple interfaces simultaneously for bandwidth incremental increases if the mobile device is stationary. MIDs also are allowed to utilize multiple interfaces simultaneously for packet loss recovery and smooth and seamless transitioning from one interface to another when the mobile device is in motion.

28 Claims, 7 Drawing Sheets

Three Modes of Operation

Figure 1: Scenarios for Packet Loss Prevention and Bandwidth Enhancement

Figure 2: Three Modes of Operation

Figure 3: Device Almost Stationary Mode

Figure 4: Device Pedestrian Speed Mode

Figure 5: Device Vehicular Speed Mode

Figure 6: Searching for Available WAN interfaces

FIG. 7

DYNAMIC USE OF MULTIPLE IP NETWORK INTERFACES IN MOBILE DEVICES FOR PACKET LOSS PREVENTION AND BANDWIDTH ENHANCEMENT

BACKGROUND

1. Field of the Invention

The present application relates generally to wireless networking, and more particularly to systems and methods for supporting the use of mobile devices having multiple heterogeneous network access interfaces, whereby such mobile devices may connect to different wireless networks and/or make use of various network access technologies, for multiple purposes such as preventing the loss of data transmission packets and also to enhance the useable bandwidth of such mobile devices.

2. General Background Discussion

Internet Protocol

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer. The layers of the OSI model are listed below.

Layer 7 (i.e., the application layer) is a layer at which, e.g., communication partners are identified, quality of service is identified, user authentication and privacy are considered, constraints on data syntax are identified, etc.

Layer 6 (i.e., the presentation layer) is a layer that, e.g., converts incoming and outgoing data from one presentation format to another, etc.

Layer 5 (i.e., the session layer) is a layer that, e.g., sets up, coordinates, and terminates conversations, exchanges and dialogs between the applications, etc.

Layer-4 (i.e., the transport layer) is a layer that, e.g., manages end-to-end control and error-checking, etc.

Layer-3 (i.e., the network layer) is a layer that, e.g., handles routing and forwarding, etc.

Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery.

Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as layers including the network layer or layer-3 in the OSI model and the like) are referred to as the higher-layers.

Wireless Networks

Wireless networks can incorporate a variety of types of mobile devices, such as cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data.

Wireless LANs (WLANs) in which a mobile user can connect to a local area network (LAN) through a wireless connection may be employed for wireless communications. Wireless communications can include communications that propagate via electromagnetic waves, such as light, infrared, radio, microwave. There are a variety of different WLAN standards that currently exist, such as Bluetooth, IEEE 802.11, and HomeRF.

For example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

Similarly, IEEE 802.11 specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

Wireless networks also may involve methods and protocols found in Mobile IP (Internet Protocol) systems, in PCS systems, and in other mobile network systems. With respect to Mobile IP, this involves a standard communications protocol created by the Internet Engineering Task Force (IETF). With Mobile IP, mobile device users may move across networks while maintaining their IP Address assigned once. See Request for Comments (RFC) 3344. Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address by using a protocol such as Internet Control Message Protocol (ICMP).

In basic IP routing, routing mechanisms typically rely on the assumptions that each network node always has a constant attachment point to the Internet and that each node's IP address identifies the network link it is attached to. In this document, the terminology "node" includes a connection point, which can include a redistribution point or an end point for data transmissions, and which can recognize, process and/or forward communications to other nodes. For example, Internet routers can look at an IP address prefix or the like identifying a device's network. Then, at a network level, routers can look at a set of bits identifying a particular subnet. Then, at a subnet level, routers can look at a set of bits identifying a particular device. With typical mobile IP communications, if a user disconnects a mobile device from the Internet and tries to reconnect it at a new subnet, then the device has to be reconfigured with a new IP address, a proper netmask and a default router. Otherwise, routing protocols would not be able to deliver the packets properly.

Handoffs of Mobile Devices

In the context of a mobile device with an IP-based wireless network interface, the mobile device needs to perform roaming or handoffs when it moves from one network to another network, or from one access point of a network to another. With existing handoff methodologies, handoff is typically accomplished by performing the following sequence of protocol layer specific handoffs:

First, handoff takes place at the physical layer. In this regard, the mobile device switches its radio channel to a wireless base station or wireless access point in the target network.

Second, handoff takes place at layer-2. In this regard, the mobile device switches its layer-2 (i.e., link-layer) connections to the target network. As explained above, the link layer or layer-2 refers to the protocol immediately below the IP-layer that carries user traffic. The mobile device performs layer-2 authentication with the target network if the target network requires such authentication.

Third, handoff takes place at the IP-layer. In this regard, the mobile device obtains a local IP address from the target network, performs IP-layer authentication if required by the target network, and then performs IP-layer location update so that IP packets destined to the mobile device can be routed by the IP network to the mobile device via the target network. In some instances, one way to support IP layer location update is to use Mobile IP defined by the Internet Engineering Task Force (IETF).

Fourth, handoff takes place at the application-layer. The mobile device performs necessary steps at the application layer to ensure that its application traffic will flow correctly to the applications on the mobile device via the target network. For example, when the mobile device uses the Session Initiation Protocol (SIP) defined by the IETF to manage its application-layer signaling, an application layer handoff can be achieved by the mobile device updating its current location with its home SIP server. The mobile device may also need to carry out application-layer authentication with the target network if required by the target network. This is the case, for example, when the mobile device is using the IP Multimedia Subsystem (IMS) in a visited 3GPP (3$^{rd}$ Generation Partnership Project) wireless network, where the IMS is a SIP-based system supporting application-layer signaling and management for multimedia applications over 3GPP networks.

Multiple Network Access Interface Mobile Devices

As the popularity and proliferation of wireless network access grows, more and more mobile devices are expected to have Multiple Interface Device (MID) capabilities. MIDs are mobile devices that contain two or more independent network interfaces, thus allowing the MID to have connectivity with two or more separate networks and/or make use of different network access technologies. The MID may have an IP address and a common IP (network) name associated with the IP address.

For example, an MID may have different wireless local-area (WLAN) interfaces such as 802.11x (i.e., IEEE 802.11a, 802.11b or 802.11g), BlueTooth, HomeRF, or Wi-Fi, different wide-area (WAN) radio interfaces such as GPRS (General Packet Radio Service), 3G, 3GPP, 3GPP2, GSM (Global System for Mobile Communications), EDGE (Enhanced Data for GSM Evolution), TDMA (Time Division Multiple Access), or CDMA (Code Division Multiple Access), both WLAN and WAN wireless network interfaces, or both wireless and wireline network interfaces.

Each network interface may contain addresses of varying types, such as an IP address, a Bluetooth Device Address, a Bluetooth Common Name, a Bluetooth IP address, a Bluetooth IP Common Name, an 802.11 IP Address, an 802.11 IP common Name, or an IEEE MAC address.

MIDs therefore provide flexibility in allowing a user to gain access to more than one type of wireless network with a single mobile device. However, additional benefits could be reaped if the MID mobile device could use the multiple network interfaces to optimize the user's communication experience. For example, when a mobile device is traveling (either in a vehicle or being carried by the user on foot) in an active session through regions of different network providers or different access point technologies, it is prone to losing data packets, which may impair real-time sensitive applications such as VoIP (Voice Over IP) or streaming media applications. In this situation, the multiple interfaces could be used beneficially for packet loss recovery. On the other hand, when a mobile device user is stationary, packet loss is not as much of a concern. Therefore in a stationary situation, the multiple interfaces could be used advantageously to increase or enhance bandwidth. The enhanced bandwidth may be useful, for example, in running high data rate applications or in sharing the load of a congested network.

Figure 7:
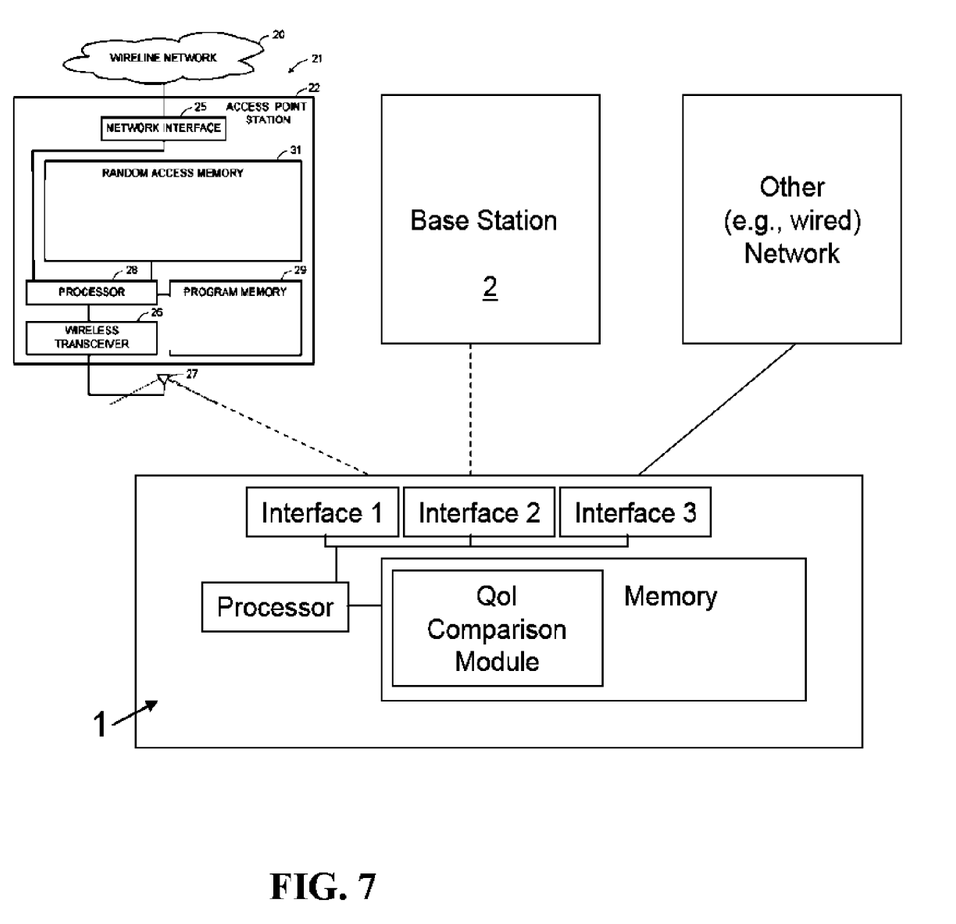
FIG. 7 is a diagram illustrating a mobile device having a plurality of interfaces which communicate with a plurality of networks, as contemplated by the present invention.

FIG. 7 shows an example of a MID mobile device 1 including a plurality of interfaces. In the illustrated example, three interfaces are shown: Interface 1; Interface 2 and Interface 3. However, any number of interfaces can be employed. In illustrative embodiments, a MID device can include portable computers, personal desk-top computers, PDAs, portable voice-over-IP telephones and/or other devices. Typically, such mobile devices will include a transceiver (including an antenna for communication with the access point), a processor, memory (including program memory and Random Access Memory). As also shown, the memory can include a program or module, such as a QoI Comparison Module for carrying out functionality as described hereinafter. In various embodiments, processes to be carried out by the MID can be performed via software, hardware and/or firmware as may be appropriate based on circumstances.

As shown in FIG. 7, mobile MID 1 is capable of communication over a plurality of heterogeneous networks via separate interfaces 1-3. For example, the mobile device can communicate via an Access Point 22 (such as a wireless LAN (WLAN) access point) or via a Base Station 2 (such as a WAN base station). Although not specifically applicable to the concepts of the present invention, FIG. 7 also shows that the MID 1 may also be able to communicate with a wired network. The Access Point 22 can be within a wireless local area network (WLAN) connected to a wireline network 20. The wireline network 20 can include the Internet or a corporate data processing network. The access point 22 also can be a wireless router having a network interface 25 linked to the wireline network 21 and a wireless transceiver in communication with the mobile device 1 as well as with other mobile devices. The wireless transceiver 26 can include an antenna 27 for radio or microwave frequency communication with the mobile devices. The Access Point 22 preferably also has a processor 28, a program memory 29, and a random access memory 31.

In general, processes are known that address packet loss prevention or Quality of Interface (QoI) measurement. Several solutions have been suggested to take advantage of heterogeneous radio technologies. These can be grouped into two categories. One considers QoI comparisons at the Physical Layer. These solutions primarily take into account Signal Strength, SNR, or sending probes to network(s) and obtaining a series of measurements of available bandwidth from different interfaces. The other category considers IP Packets received at the IP Layer. Such solutions mainly take into account a quantitative comparison of the number of IP packets received on each IP stream. However, such processes represent partial solutions only, and do not provide a solution to the issues discussed above with respect to the dynamic use of multiple network interfaces for different purposes depending upon the stationary/moving status of the mobile device. Additionally, the known solutions pertaining to both categories each have various drawbacks or weaknesses. Consequently, there remains a need in the art for solutions to the above issues and problems related to improved and enhanced functionality of wireless MIDs.

SUMMARY OF THE PREFERRED EMBODIMENTS

The present invention provides a novel solution to the shortcomings discussed above. The invention is tailored as a situation driven solution, which identifies the particular status of a MID and addresses the particular problems associated with that status. In particular, the invention recognizes that packet loss is due mainly to transitions in the Network Layer and the Physical Layer, and consequently utilizes two comparators, a Physical Layer Comparator (abbreviated as PHYCOM) and a Network Layer Comparator (abbreviated as NETCOM), which perform in conjunction with each other.

PHYCOM performs a dynamic and qualitative comparison of multiple radio Interfaces, whereas NETCOM performs a quantitative comparison of packet streams received at the IP Layer of the mobile device through multiple interfaces. The comparators' results are coordinated and reinforce each other's actions to prevent packet loss when the device is in motion, and to enhance bandwidth when the mobile device becomes stationary, by using multiple interfaces simultaneously to achieve superior Quality of Service (QoS). The present invention offers several desirable features:

The notion of "situation awareness" adds several features and enables the MID to respond to the needs of time-sensitive applications promptly.

MIDs are allowed to utilize multiple interfaces simultaneously for bandwidth incremental increases if the mobile device is stationary.

MIDs are allowed to utilize multiple interfaces simultaneously for packet loss recovery and smooth and seamless transitioning from one interface to another.

The invention provides Awake and Sleep mechanisms for physical interfaces as well as an IP comparator for battery life extension.

To meet such situational calls, the MID must be able to dynamically determine which interface to use, when to switch from one interface to another, and also when to use multiple interfaces simultaneously. This ability contributes towards smooth handoff, minimal data loss, minimized delay, and enhanced bandwidth, which are desirable goals to achieve a superior QoS.

In particular, the preferred embodiments of the present invention fulfill the existing need as explained above by providing a mobile device, including a plurality of network interface devices, each capable of connection to a wireless communication network; and a processor that determines whether the mobile device is stationary or moving, and based on a result of the determination, institutes a mode of operation for the mobile device to use the plurality of network interface devices either to enhance communication bandwidth or to assist in packet loss recovery.

According to other aspects of the invention, a method is provided for selectively using different network interface devices of a mobile communication device in accordance with a stationary/motion status of the mobile communication device, including the steps of determining whether the mobile communication device is stationary; if the mobile communication device is determined to be stationary, activating a stationary mode of operation wherein a secondary network interface is turned on to be used simultaneously with a primary network interface to provide enhanced communication bandwidth when running certain applications on the mobile communication device; if the mobile communication device is determined to be in motion, further determining whether said motion is a low speed motion or a high speed motion; if the mobile communication device is determined to be in a low speed motion, activating a low speed mode of operation wherein a secondary network interface is turned on to be used simultaneously with a primary network interface device to recover missing packets from the primary network interface, and wherein the secondary network interface may include a WLAN; and if the mobile communication device is determined to be in a high speed motion, activating a high speed mode of operation wherein a secondary network interface is turned on to be used simultaneously with a primary network interface to recover missing packets from the primary network interface, and wherein the secondary network interface may not include a WLAN.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

According to the present invention, a MID mobile device is able to detect the situation in which it is operating. According to the detected operating situation, most of the complex processes, circuits, and algorithms running in the device, including radio interfaces, can be either run more efficiently or turned off to save power. Situations taken into consideration according to one embodiment of the invention are shown in FIG. 1.

Figure 1:
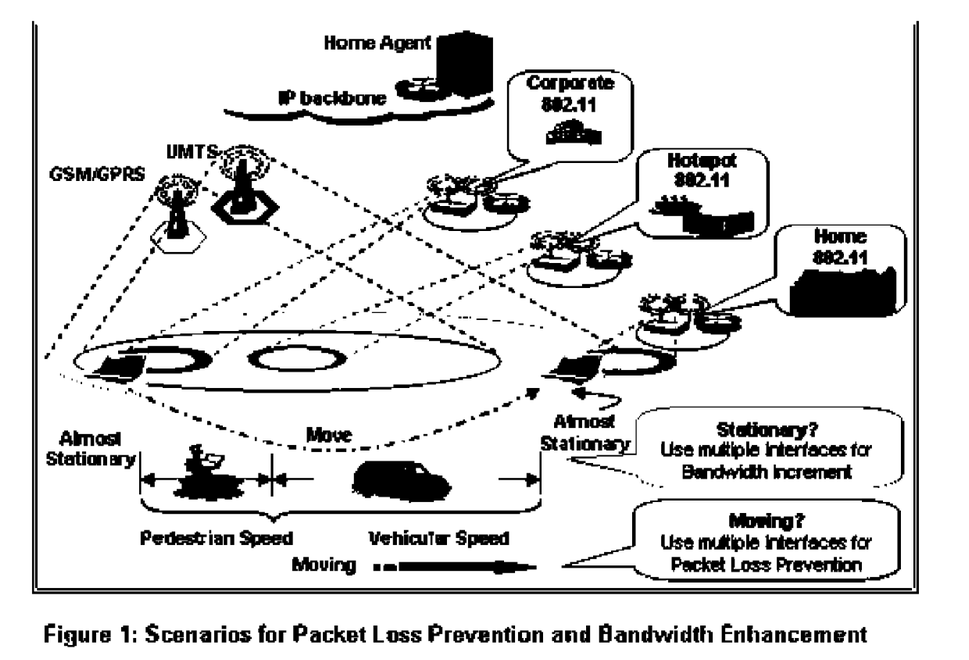
FIG. 1 is a diagram illustrating various scenarios where a MID is used under which the present invention would be implemented.

A WAN, as depicted in FIG. 1, often covers a large physical area (e.g., a few hundred yards in dense urban areas, around 3 miles in less dense urban areas and around 10 miles in rural areas or highways passing through rural areas). Several small footprints of WLANs or PANs (Personal Area Networks) may exist in the trajectory of a WAN Cell. FIG. 1 shows three WLAN networks (Corporate, Hotspot and Home) and a WAN as a cellular network only (i.e. GSM/GPRS and UMTS) for purposes of explanation. However, the invention contemplates a variety and plurality of WANs and WLANs. The WAN may include Cellular, WiMax or any other interfaces that may become available in the future. Also a WLAN and a PAN may include all the different configurations and features of IEEE 802.11 networks, as well as other networks.

FIG. 1 shows three situations, i.e. the user is either (i) Stationary, or (ii) Walking, or (iii) Driving, with a voice or data session in progress. These situations are represented in the present invention as:
1) "Device Almost Stationary" situation;
2) "Device at Pedestrian Speed" situation; and,
3) "Device at Vehicular Speed" situation.

The MID operation pertaining to these situations is represented by the following three modes:
Mode 1: Device Almost Stationary Mode (abbreviated as DAS Mode);
Mode 2: Device at Pedestrian Speed Mode (abbreviated as DPS Mode); and,
Mode 3: Device at Vehicular Speed Mode (abbreviated as DVS Mode).

Usage Scenarios (A) DAS Scenario:

Consider an employee MID user working in an office throughout the day. She uses a corporate WLAN for all kinds of applications because the WLAN provides a higher bandwidth and also because she has low or no mobility. Her MID perceives that the available bandwidth does not meet the present need of time sensitive applications running on it (e.g., because several users are contending for the available bandwidth). To cope with this situation, the user's MID may turn on a WAN Interface in addition to the WLAN interface for bandwidth incrementation. Turning on the WAN interface is feasible because the corporate WLAN falls within the footprint of a WAN as shown in FIG. 1.

Since the MID is stationary, it activates the DAS mode. This mode of operation turns off all interfaces except the primary one, or the secondary one if running an application that needs enhanced bandwidth.

(B) DPS Scenario:

Now consider that during the lunch break the employee MID user walks to a nearby cafeteria with the MID and application ON. The MID detects the motion type (pedestrian) and changes its mode from DAS to DPS. While in motion, the MID perceives that the quality of the primary interface is decreasing (e.g., because the user is moving out of the coverage area of the corporate WLAN and the SNR/SS are deteriorating). To cope with this situation, the MID turns on the WAN Interface in addition to the WLAN for packet loss prevention (not for bandwidth incrementation). However, as the user is completely out of the coverage area of the WLAN, the session is ultimately handed over to the WAN, which has a broader coverage area as shown in FIG. 1. (upon reaching the cafeteria, if the MID again becomes stationary, it will change back to DAS mode).

When the MID is moving at pedestrian speed, it activates the DPS mode. This mode of operation turns on a WAN interface (if available) in addition to WLAN for lossless handover from WLAN to WAN.

C) DVS Scenario:

While commuting back home in the evening by car, the MID detects the motion type (vehicular) and changes its mode from DAS to DVS. In this mode, the ongoing session is handed off to a WAN. Also in this mode, if more than one WAN is available, additional WANs may be kept on standby. The WLAN interface is turned off. While the MID might have detected several WLANs on the trip back to the user's home, the DVS mode did not turn them ON, because the high vehicular speed (e.g., 60 mph) rendered it neither feasible nor desirable to handover the session to such WLANs.

On arrival at home, the MID again detects the "almost stationary" status and hands over to the Home WLAN of the user to operate under the influence of the Home WLAN. At the user's home, there is patchy coverage of both a WAN as well a WLAN. For instance, in a sitting room both WAN and WLAN are available; in the backyard WAN is available but WLAN is not available, whereas in the basement WLAN is available but WAN is not available. In the sitting room, the MID can operate in DAS mode, and if necessary may use WLAN and WAN for enhanced bandwidth applications. Going to the backyard, DPS may be triggered for packet loss recovery and ultimate session handing over to WAN. Going from the backyard to the basement, the DPS mode may handoff from WAN to WLAN for packet loss prevention. Of course, there may be places where there is no coverage at all by any of the networks. Such places will be regarded as no service areas.

Modes of Operation

Various modes of operation of a MID according to embodiments of the invention will be now explained in conjunction with the flow diagrams of FIGS. 2-5. The main functional components shown in these figures are (i) PHYCOM, or Physical Layer Comparator (ii) NETCOM, or Network Layer Comparator, (iii) Motion Detector, and (iv) Predictor. These functional components can be implemented by software, and their role in accordance with the embodiments of the invention are explained below. However, first the terms "Primary Interface (PI)" and "Secondary Interface (SI)" as used hereinafter will be defined.

The Primary Interface (PI) is the interface selected by a MID as a default based on the user's entered policy. For example, in comparing WLAN and WAN, WLAN is assumed to be the PI as it offers more bandwidth at less cost, even though its geographical coverage is reduced; and WAN is assumed to be a secondary interface as it offers less bandwidth at more cost even though its geographical coverage is better. Also, comparing WAN1 (cellular) and WAN2 (WiMax), WAN2 would be assumed as the PI as it offers more bandwidth at less cost, even though its technology is not fully matured; and WAN1 is assumed to be the secondary interface as it offers less bandwidth and more cost even though its technology is very much matured. It will be noted that the selection and prioritization of wireless interfaces may vary from user to user as per the user's individual preference.

The Secondary Interface (SI) is the interface selected by a MID either in the absence of the PI, or to assist the PI for performance enhancement. Performance enhancement may include the following:

(i) Provision of additional bandwidth particularly if the application is bandwidth hungry, or if the available throughput/bandwidth/SNR is declining; and (ii) Replenishing those lost packets that might have been received on SI but not on the PI.

Moreover, the term MID as used in this document may mean the mobile device itself or the user possessing the MID.

Description of Motion Detection Process (MDP)

Figure 2:
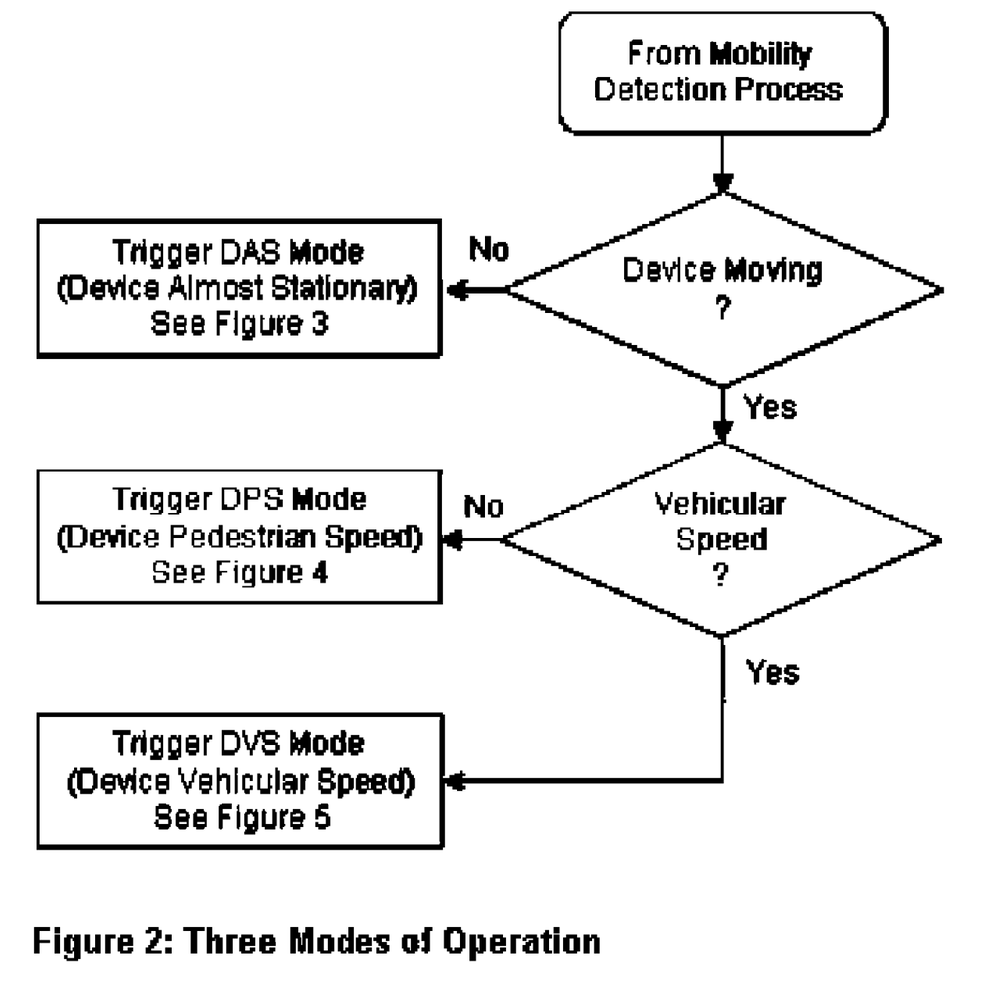
FIG. 2 is a flow diagram illustrating three modes of operation in accordance with one embodiment of the invention.

In accordance with the invention, a mobility detector is provided in the MID. The mobility detector can be a software process and abbreviated as MDP (Mobility Detection Process). As shown in FIG. 2, the MDP dynamically guides the MID for using the most effective mode of operation. For example:

If the MID is stationary or moving slowly (e.g., zero to <1 mph), it triggers the DAS Mode. As used throughout this document, the term "stationary" thus is defined to include motion of less than a predetermined speed. DAS mode resolves to turn off unneeded interfaces, algorithms (i.e. pertaining to mobility management, e.g., handover, NETCOM mechanism (discussed below) etc). Only one interface is kept ON unless the application calls for any of the other interfaces to be activated for bandwidth incrementation.

If the MID is moving at a pedestrian speed (e.g., 1-4 mph), it triggers the DPS Mode. DPS Mode resolves to turn on the NETCOM mechanism for packet loss recovery and smooth session transition between heterogeneous interfaces (e.g., from WLAN to WAN) if needed.

If the MID is moving at a vehicular speed (e.g., >4 mph), it triggers the DVS mode. DVS Mode resolves to turn off WLANs and turns on the NETCOM mechanism for packet loss recovery and smooth session transition between heterogeneous interfaces (e.g., from WAN1 to WAN2).

The Mobility Detection Process can use one or a plurality of methods to estimate the MID's speed. Since determining the exact speed is not the objective and only a coarse estimate (e.g., Almost Zero, between 1 and 4 mph, and greater than 4 mph) is needed, the following methods can serve this requirement quite effectively. MDP can easily determine if the device is almost stationary from one of the following measurements:

1. Use the predicted diameter of networks and estimate the time it takes a MID to traverse that network. Record the time the MID traversed similar types of networks in the recent past. For example, IEEE 802.11 networks have similar coverage ranges. Therefore, the MID can estimate the time it will spend in the next 802.11 network based on the times it has just spent in each 802.11 network in the recent past.

2. Checking Mapping with Subnet address could be another way of finding if the device is stationary or not. If the Subnet Address does not change, MPD can make an educated guess that the device is almost stationary.

3. The MAC (Media Access Control) layer signals in most radio networks allow a MID to determine when it will receive the next radio beacon from a certain network. For example, an IEEE 802.11 Basic Service Set (BSS), which is a set of Access Points that form a local area wireless network, typically sends beacons in 100 ms intervals. If the MID receives all the consecutive beacon signals at regular time intervals, for example, $(100+\Delta T)$ ms where $\Delta T$ is the beacon propagation time from an access point to the MID. If $\Delta T$ stays constant, it indicates that MID is stationary. If $\Delta T$ decreases or increases it means the MID is moving in the direction or away from the AP from which the radio beacon is received. If $\Delta T$ is increasing, it means the MID is going away from the access point that is sending the beacons and the inverse is also true. The rate at which $\Delta T$ increases or decreases can be therefore be the predictor of the MID's speed as well as the direction. Using the MID's estimated moving speed and the estimated coverage range of a network, the MID can estimate the time it will take to go through the network.

MPD can easily find out if the device is moving above or below 4 mph from one of the following techniques:

4. Using the Cell Global Identity (CGI) from cellular networks can be another way of measuring speed. Location parameters are broadcast on a Broadcast Control Channel in the cellular network and are used by the MS's cellular network interface for mobility management in the cellular network. The (U)SIM (which is specific to cellular network) in MS stores these parameters and updates them periodically as the MS traverses the cells of a cellular network. Mobility can be estimated how rapidly the MID is traversing the networks.

5. Having a PAN (e.g., Bluetooth) interfaced with a vehicle's electronic odometer.

6. Getting and estimating how rapidly geographical coordinates, received from a GPS device, are changing. It is also assumed that most MIDs in the future will also have GPS integrated in them.

Description of DAS Mode

Figure 3:
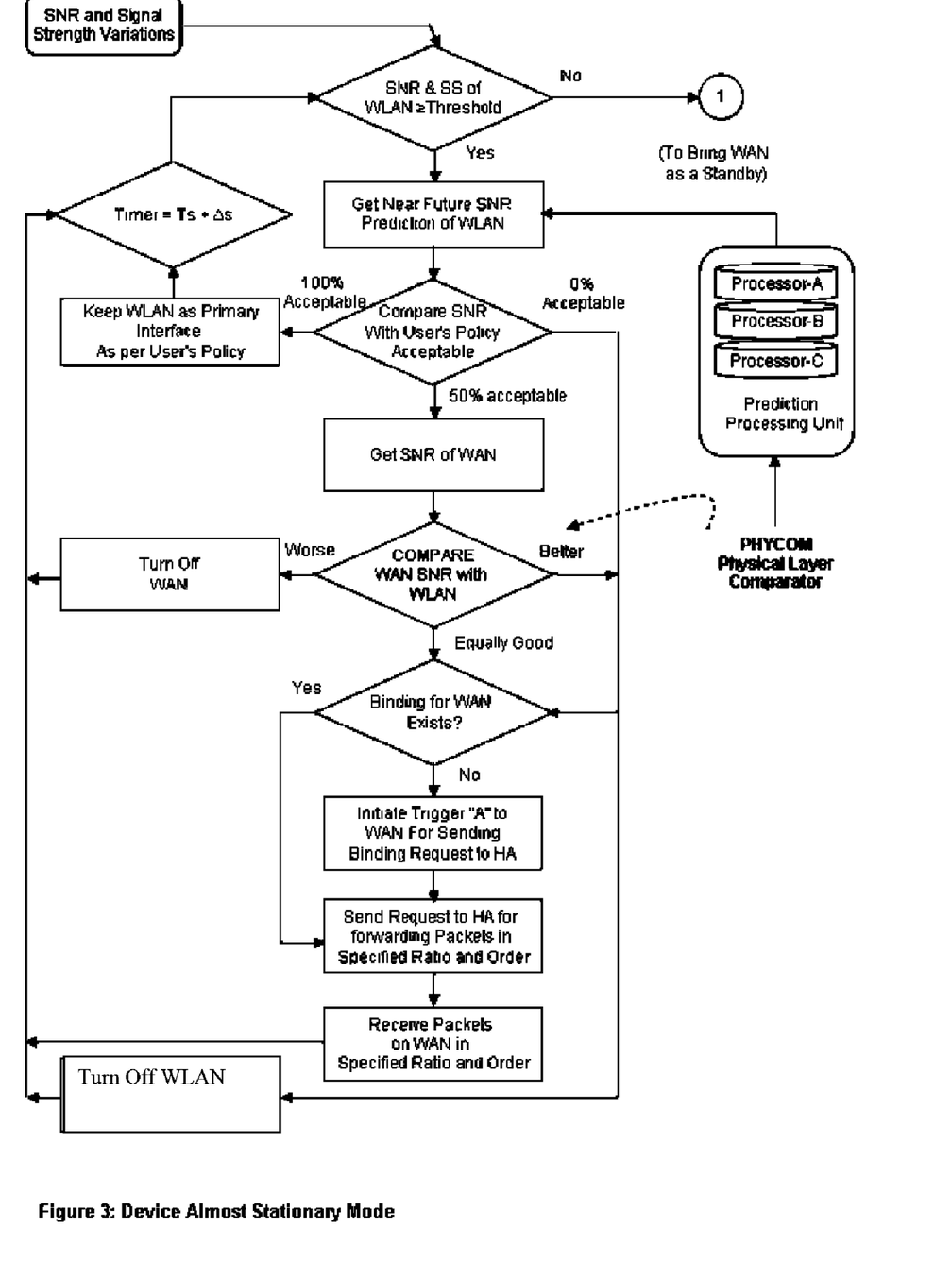
FIG. 3 is a flow diagram illustrating a "device almost stationary" mode of operation according to one embodiment of the invention.

The DAS operating mode is illustrated in FIG. 3. The bias of this mode is to offer enhanced bandwidth if either a running application is bandwidth hungry or data reception is not up to the user's expectations. The DAS mode can accomplish this by activating an additional network interface, such as the Secondary Interface (SI). To achieve these objectives, PHYCOM plays an important role.

PHYCOM is capable of bringing SI ON if either the user is not 100% satisfied with the performance of the Primary Interface (PI) as it is not offering adequate bandwidth for the presently running application or if PI is not available at all (i.e. 0% user's acceptability). To determine whether the SI qualifies to offer bandwidth incrementation, the algorithm performs the following steps as shown in FIG. 3:
1. Compare Signal to Noise Ratio (SNR) and Signal Strength (SS) of the WLAN (PI) with a minimum threshold;
2. Obtain the Near Future Predicted SNR and SS of the PI from the Prediction Unit; and,
3. Compare the Near Future Predicted SNR and SS with the User's Policy, established by the user in a User Policy Repository (not shown).

If the SNR of the WLAN (PI) is completely acceptable in accordance with user policy, then the WLAN is maintained in active service without triggering the SI, and will be periodically checked for changes in quality. If the SNR is not completely satisfactory per the user's policy, then the SNR of the WAN (SI) is obtained and compared with the SNR of the WLAN (PI). If the SNR of the SI is at least equally as good as that of the PI, then the SI is considered to qualify to assist PI for bandwidth incrementation. The DAS algorithm then issues a trigger to activate the SI. Upon activation, SI sends a binding request to the Home Agent (HA) for a secondary Care of Address (CoA). In this request the SI also informs HA of the preferred packet forwarding policy by specifying the ratio (e.g., PI:SI=75:25) and order in which it wants to receive packets on the two interfaces (for example, packets with even sequence numbers to be received on PI and packets with odd sequence numbers to be received on SI, or flow type, or port number, etc). In case SI does not qualify (e.g., where the SNR of SI is worse than that of PI), it is turned off for a period of time "(Ts+Δs)" which is defined as the DAS Mode Sleep Time. Since the MID is stationary and the SI is a WAN, it is assumed that the radio characteristics of the WAN will not change drastically over a short period of time. Therefore the value of (Ts+Δs) can be set higher to allow more sleep time. This Δs is the amount of increment or decrement on the predictor's input. It also can be made a function of a behavioral historical log of the MID through a learning process.

In case PI does not meet the user's expectations at all (0% acceptability), or the SNR of SI is better than that of PI, the DAS algorithm also issues a trigger to activate the SI. This similarly causes SI to send a binding request to HA for a Care of Address (CoA). In either of these two latter cases, the MID also turns off PI, and thus HA sends all user packets on SI (i.e. ratio PI:SI=0:100). In this case SI acts as PI, however PI is checked at regular time intervals (Ts+Δs) for possible improvement in quality.

PHYCOM also has the capability to translate SNR into real time available bandwidth as per the following well-known mathematical relation:

$$C = B * \log 2(1 + S/N)$$

where C is the achievable channel capacity, B is the bandwidth, S is the average signal power and N is the average noise power.

With this capability, PHYCOM can determine how efficient an Interface is at any instant of time. For example considering 802.11b, the data rate announced through a beacon is 11 Mbps. If SNR, translated into available bandwidth, at any instant is, for example, 2 Mbps, the Interface Efficiency is thus 18%. With the knowledge of efficiencies of both PI and SI, PHYCOM can compare both interfaces and influence the packet ratio request sent to HA.

Figure 6:
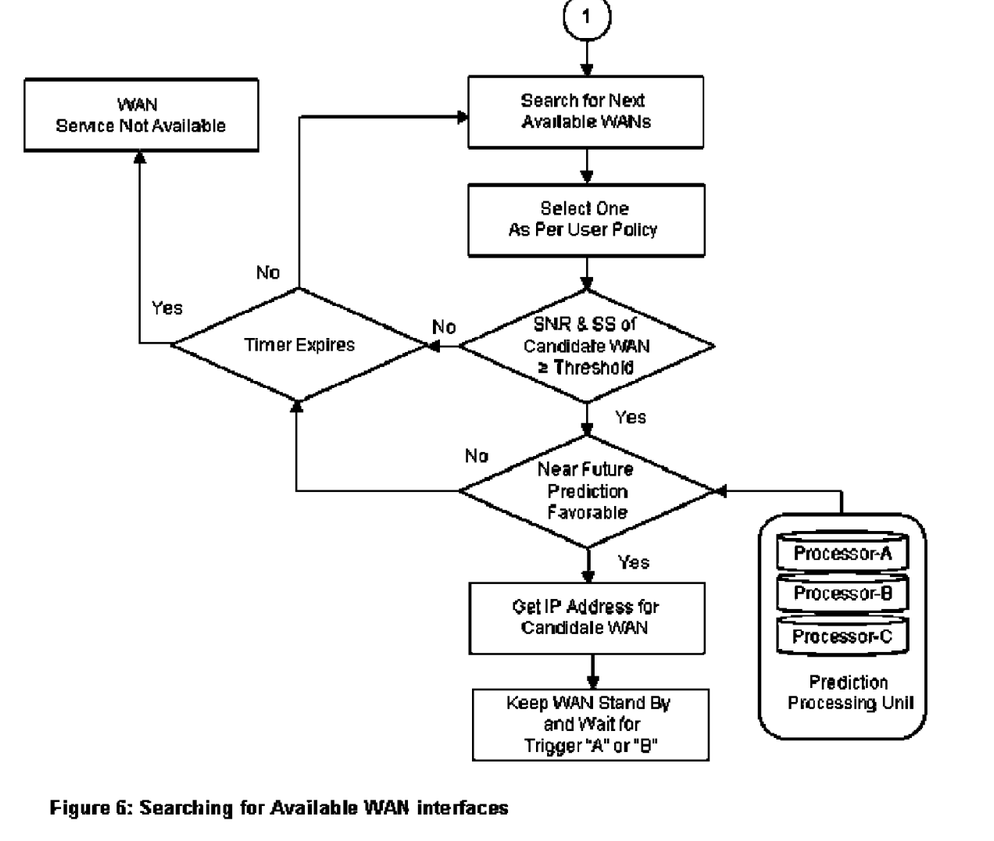
FIG. 6 is a flow diagram illustrating a mode of operation of searching for an available WAN according to one embodiment of the invention.

It is to be noted that as shown in FIG. 3 if the SNR or SS of PI is below the minimum threshold, the SI is immediately triggered ON to a standby state by acquiring an IP address but not yet having a binding/registration with HA, as shown in FIG. 6 (described below). Binding will be performed when a binding trigger is issued. De-registration of any deteriorating or unavailable interface can be done through any available interface.

According to the current Mobile IPv6 specification, a mobile node may have several CoAs, but only one, termed a "primary care-of-address," can be registered with its HA. To have multiple active IPv6 CoAs, some extensions to the Mobile IPv6 specification are needed. One possible way suggests using a new "Unique Binding ID" that must be carried in each binding request. Thus, the Unique Binding ID identifies each binding registered by the mobile node. Whereas the home address identifies a mobile node itself. If the CoA is a primary address, it may set a P flag in the Unique Binding ID. If a mobile decides to delete all bindings for its home address, it sends a regular de-registration binding update i.e., resetting of b flag and excluding the Unique Binding ID. If a mobile wants to delete a particular binding, such could be done by specifying that address. In the DAS mode, as shown in FIG. 3, PHYCOM also sends the results of comparison to the Prediction Processing Unit. Furthermore, in the DAS mode of operation, PHYCOM does not interact with NETCOM.

Description of DPS Mode

Figure 4:
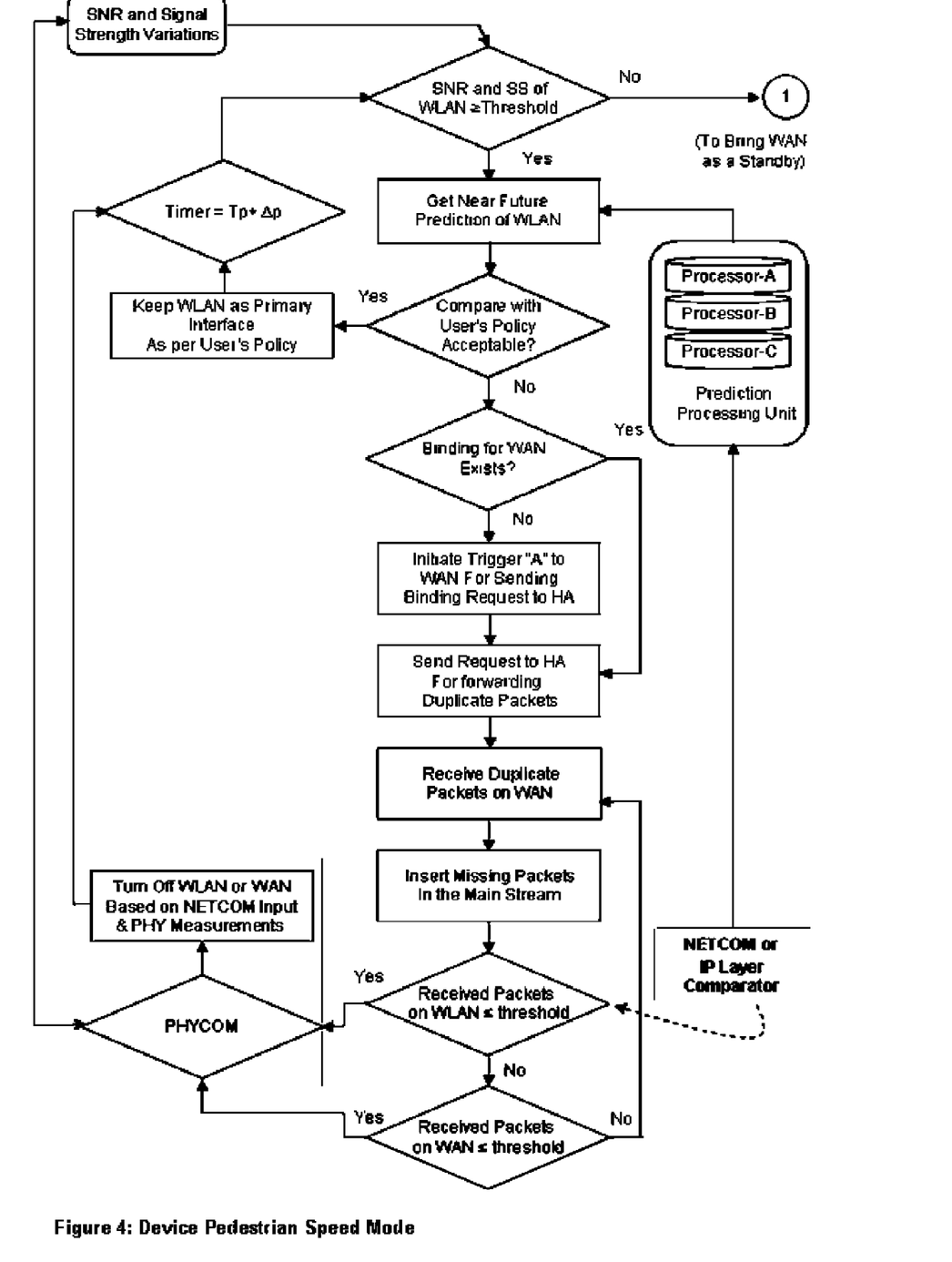
FIG. 4 is a flow diagram illustrating a "device at pedestrian speed" mode of operation according to one embodiment of the invention.

The DPS operating mode is depicted in FIG. 4. The bias of this mode is to prevent packet loss during a vertical handoff, to provide a smooth and graceful transition from one interface to another, and to turn off the unneeded interface. Thus bandwidth incrementation is not a primary goal in DPS mode. To achieve these objectives NETCOM plays an important role.

NETCOM is capable of comparing IP packets received on both PI and SI, and replenishing the missing packets from one interface that might have been received on the other. To enable the comparison, both interfaces needed to be turned on. PI is turned on by default and SI is turned on when PI deteriorates to an unacceptable level as defined in the user's policy. To determine the unacceptability level of PI, the algorithm performs the following steps as shown in FIG. 4:
1. Compare Signal to Noise Ratio (SNR) and Signal Strength (SS) of the WLAN (PI) with a minimum threshold;
2. Obtain the Near Future Predicted SNR and SS of the PI from the Prediction Unit; and,
3. Compare the Near Future Predicted SNR and SS with the User's Policy, established by the user in a User Policy Repository (not shown).

If the state of the PI meets the user's policy criteria for acceptability, then the PI is maintained in service and periodically checked for any change in quality. If the PI does not meet the user's acceptability standards, then SI will be activated, and bound to HA. NETCOM then performs comparator functions to meet mode objectives as stated above.

To perform the comparator functions efficiently, NETCOM may buffer all of the packets that are received on SI and whenever NETCOM detects that a packet is missing on the PI, it replenishes the missing packet from the buffer. The buffer time is set to be greater than the timeout time (i.e. the time after which a NACK (Non-Acknowledgment) signal is sent). After elapse of the buffer time, all the packets from the buffer are flushed as they are no longer of use. During the buffer time NETCOM tracks the sequence numbers of the IP packets received on both PI and SI. Whenever a disparity in the sequence numbers for PI is detected, packets on SI are sought corresponding to those missing sequence numbers, and replenished if SI has already received them.

For example, if PI has received packets with sequence numbers 1, 2, 4, 7, 8, 9, and has not received packets with sequence number 3, 5 and 6 within the timeout period, and if SI has received those packets, NETCOM will detect this discrepancy, and will insert the packets with sequence numbers 3, 5, and 6 from the buffer into the main stream. Even though the missing packets are replenished by SI, unlike the prior art, PI will not be precluded from a retransmission request by sending a NACK. This will inform the HA about the health of PI (or SI) and how fast or slowly the interface is deteriorating. Based on this the HA can update the policy regarding packet flow on multiple interfaces. This establishes a dynamic packet transmission policy for each interface. If PI as well as SI are both handicapped to fill the packet loss, a NACK from both interfaces will be generated and HA will understand that the packet is really lost, otherwise HA will assume that packet has been replenished from the duplicated stream.

In another embodiment of the present invention, instead of allowing NACKs even for the replenished packets, just the total number of packets replenished can be sent to HA. This total number list will also give HA enough knowledge about the physical condition of any deteriorating interface to establish a dynamic packet transmission policy.

If NETCOM receives less than a minimum threshold number of packets on any of the interfaces, it informs PHYCOM, which is receiving PHY layer measurement parameters. PHYCOM will turn unhealthy interfaces off based on the combined information received from NETCOM and its own physical measurements. Thus both NETCOM and PHYCOM work in coordination in the DPS mode, but only PHYCOM is authorized to turn any interface ON/OFF. Authorizing only one interface to handle the ON/OFF operation will thus avoid any possible conflict.

When PI is turned off, SI takes over. De-registration of PI or any unavailable interface can be done through any available interface. However, the interfaces are periodically evaluated after each time interval $(Tp+\Delta p)$. Since the MID device is neither stationary nor moving at a very high speed, the value of $(Tp+\Delta p)$ may be set less than $(Ts+\Delta s)$ and greater than $(Tv+\Delta v)$ where $\Delta p$ is the amount of increment or decrement based on the predictor's input. It can also be made a function of device behavior if a behavioral log for the device is prepared through a learning process.

Like the DAS mode, if the SNR or SS of PI in the DPS is below the minimum threshold, the SI is immediately triggered ON to a standby state by acquiring an IP address but not yet having a binding/registration with HA, as shown in FIG. 6 (described below). Binding will be performed when a binding trigger is issued. Also like the DAS mode, NETCOM sends the results of comparison to the Prediction Processing Unit.

Description of DVS Mode

Figure 5:
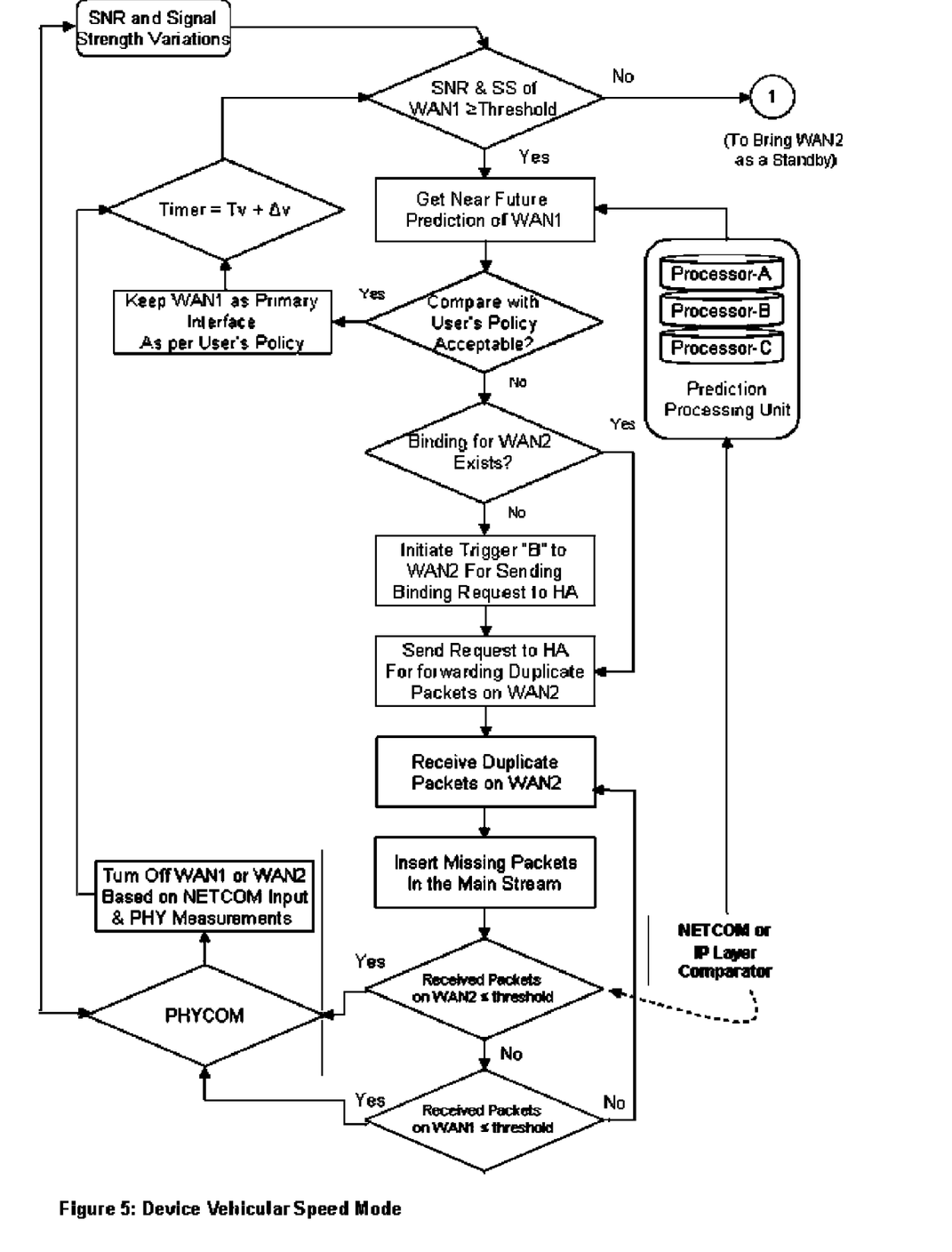
FIG. 5 is a flow diagram illustrating a "device at vehicular speed" mode of operation according to one embodiment of the invention.

The DVS operating mode is described in FIG. 5. Like the DPS mode, the bias of the DVS mode is to prevent packet loss during a vertical handoff and to turn off any unneeded interface(s). In this regard, the DPS mode and the DVS mode are exactly the same except for the following two differences:

In the DPS mode the PI is a WLAN and the SI is a WAN, whereas in DVS mode, PI and SI both are WANs (e.g., WiMax and Cellular). Also in the DVS mode if more than one WAN is available they may be kept available; however, WLAN interfaces are turned off, regardless of whether available WLANs may be detected. This is because the potentially high vehicular speed (60 mph or more), renders it neither feasible nor desirable to hand-off to WLANs.

Since the MID device is moving at a very high speed, the value of $(Tv+\Delta v)$ is set much less than $(Tp+\Delta p)$ where $\Delta v$ can be increased or decreased by $\Delta$ amount based on the predictor's input. It can also be made a function of a device behavioral log prepared through a learning process.

In each of the above operating modes, when it is initially determined that the quality of the PI is below a minimally acceptable level, processing may proceed to the algorithm shown in FIG. 6. According to this process, the MID will search for additional available WANs, and select one in accordance with the user's existing policy. The SNR and SS of the selected WAN are then compared against minimum threshold levels. If the levels do not meet the thresholds, and a timeout period has not expired, then another WAN is searched for and selected, and this search and selection process is repeated until either expiration of a timeout period (in which case the MID will display a "no service available" message) or discovery of an acceptable WAN. Next, the Near Future SNR Prediction is retrieved from the prediction processing unit and compared with user policy. Again, if the Near Future Prediction value is below user policy standards, another WAN is searched for until expiration of the timeout period. Otherwise, an IP address is obtained from the acceptable WAN and the WAN is kept on standby until triggered as explained in FIGS. 3-5.

Description of Predictor

According to the present invention, the MID selects which interface to use individually, when to switch between interfaces, or which interfaces to use simultaneously and when to turn off any unneeded interface. A key question to answer before activating/deactivating the interfaces is whether a new interface(s) will provide superior quality as desired by the user for a future time period. For this the input from the prediction process is used.

Although modeling a traffic correlation structure or predicting channel conditions is difficult, it is believed that such precision is not necessary for achieving the goals of the present invention, and a traffic-assisted channel and channel-assisted traffic estimation can be used for prediction in wireless networks. Thus a locally prepared database of "RF Transmission," "Typical Traffic Statistics," "Packet Size Distribution," and "User Behavior" can be used for future or near future predictions. Thus, making a log of the following parameters dully mapped with "Location" and "Time" can be used to prepare a prediction about any interface.

1) RF Transmission: Wireless networks' SNR and SS are affected by the RF transmission characteristics. These transmissions characteristics change with time, location, building layouts, obstacles, surrounding environments and antenna characteristics. Thus empirical model can be prepared based on site-and time-specific information. These models can be used later on for prediction of SNR at a WLAN/WAN receiver. Similar models have been widely used in the cellular industry for propagation prediction.

2) Traffic Time-series: A Traffic Time Series Log, mapped with given location(s) (office, home, cafeteria, etc.) can be prepared. Thus throughput spikes and periods of high throughput demand can be recorded to find out the distribution of hourly network usage varied from day to day. This is important because total traffic load might not be necessarily proportional to the number of users (employees in an office or family members in a house) but on their usage behavior.
3) Packet Size Distribution and Network Usage Pattern: this describes the ratio of outbound traffic volume to inbound traffic volume. This is important because most outbound packets are "request" packets, which are generally smaller than inbound "response" packets. For example, Internet users generate smaller request packets and wait for larger response packets (for web browsing, news downloads, etc.) Such activities are generally seen more at public places (like home, cafeteria, hotspots, libraries etc), and during leisure hours (like early morning, lunch break, weekends etc.) Thus, making a log of a cumulative distribution function of packet sizes and traffic volume mapped with location and time can have a positive impact on the prediction.
4) Typical Applications: Though the TCP/UDP traffic load is typical, with the fast growth of real-time video/audio applications, especially voice over IP (VoIP), gaming, NNTP news reading and file sharing, the traffic load generated by several well-known applications will be large. However usage of such applications will vary with many factors, such as user locations, surrounding environments and the time of day. Thus mapping this kind of information may help make effective predictions.

In summary, the concept of situational awareness coupled with multiple network interface capability enables the MID to respond to time sensitive applications' needs in an optimized and prompt manner. It also enables the MID to avoid sudden and unexpected blackout periods while moving through heterogeneous radio interfaces and/or patchy coverage.

The invention also offers several desirable features. For example, based on the situation, timer values can be adjusted so that the signaling communication with the network can be made more effective and efficient, thereby rendering network signaling overhead small. Furthermore the invention improves efficient use of battery power as it avoids keeping multiple interfaces ON, avoids continuously running all algorithms that are related to bandwidth enhancement and packet loss prevention/recovery (e.g. NETCOM and PHYCOM), and it avoids continuously running other algorithms such as mobility management related circuitries and processes.

The invention thus provides a soft, smooth and graceful handoff even between heterogeneous networks and ensures that seamless mobility can be achieved without packet loss. It also provides interoperability between multiple interfaces including Cellular, WiMax, and WLAN systems. Furthermore it provides a platform on which the HA can make packet flow policy for multiple different interfaces.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A mobile device, comprising:
a plurality of network interface devices, each capable of connection to a wireless communication network; and
a processor that determines whether the mobile device is stationary or moving, and based on a result of the determination, institutes a mode of operation for said mobile device to use said plurality of network interface devices either to enhance communication bandwidth or to assist in packet loss recovery;
wherein said processor determines whether the mobile device is stationary or moving, and based on a result of the determination institutes a mode of operation, using a physical layer comparator and a network layer comparator, for said mobile device to use said plurality of network interface devices either to enhance communication bandwidth or to assist in packet loss recovery;
wherein said physical layer comparator is configured to perform a comparison of multiple interfaces.

2. The mobile device of claim 1, wherein said network interface devices include a WLAN interface connecting to a WLAN and a WAN interface connecting to a WAN.

3. The mobile device of claim 2, wherein upon determination by said processor that said mobile device is stationary, a stationary mode of operation is activated wherein said WLAN interface is chosen as a primary interface, and said WAN interface is chosen as a secondary interface.

4. The mobile device of claim 3, wherein in said stationary mode of operation, said WAN interface is used to provide an increase in communication bandwidth when necessary for running applications on said mobile device.

5. The mobile device of claim 4, wherein in said stationary mode of operation, said WAN interface also is used when communication quality of said WLAN is below a minimum level of acceptability.

6. The mobile device of claim 3, wherein in said stationary mode of operation, said WAN interface is prevented from being used when communication quality of said WAN is worse than communication quality of said WLAN.

7. The mobile device of claim 2, wherein said processor further periodically monitors communication quality of said WLAN and said WAN.

8. The mobile device of claim 2, wherein upon determination by said processor that said mobile device is moving, a motion mode of operation is activated wherein said WLAN interface is chosen as a primary interface, and said WAN interface is chosen as a secondary interface.

9. The mobile device of claim 8, wherein in said motion mode of operation, said WAN interface is used to provide packet loss recovery when necessary to replenish packets missing from a session active on said WLAN interface.

10. The mobile device of claim 9, wherein in said motion mode of operation, said WAN interface also is used when communication quality of said WLAN is below a minimum level of acceptability.

11. The mobile device of claim 8, wherein in said motion mode of operation, said WAN interface is prevented from being used when communication quality of said WAN is less than a predetermined threshold.

12. The mobile device of claim 8, wherein in said motion mode of operation, said WLAN interface is prevented from being used when communication quality of said WLAN is less than a predetermined threshold.

13. The mobile device of claim 8, wherein said processor further periodically monitors communication quality of said WLAN and said WAN.

14. The mobile device of claim 1, wherein when said processor determines that said mobile device is moving, said processor further determines whether a speed of said motion is a low speed or a high speed.

15. The mobile device of claim 14, wherein upon determination by said processor that said mobile device is moving at a high speed, a high speed motion mode of operation is activated wherein said first WAN interface is chosen as a primary interface, and said second WAN interface is chosen as a secondary interface.

16. The mobile device of claim 15, wherein in said high speed motion mode of operation, said second WAN interface is used to provide packet loss recovery when necessary to replenish packets missing from a session active on said first WAN interface.

17. The mobile device of claim 16, wherein in said high speed motion mode of operation, said second WAN interface also is used when communication quality of said first WAN is below a minimum level of acceptability.

18. The mobile device of claim 15, wherein in said high speed motion mode of operation, said first WAN interface is prevented from being used when communication quality of said first WAN is less than a predetermined threshold.

19. The mobile device of claim 15, wherein in said high speed motion mode of operation, said second WAN interface is prevented from being used when communication quality of said second WAN is less than a predetermined threshold.

20. The mobile device of claim 15, wherein said processor further periodically monitors communication quality of said first WAN and said second WAN.

21. The mobile device claim 1, wherein said mobile device is configured such that upon a determination by said processor that said mobile device is stationary, a stationary mode of operation is activated wherein a secondary network interface device is operated simultaneously with a primary network interface device to provide enhanced communication bandwidth when running certain applications on said mobile communication device.

22. The mobile device of claim 1, wherein said mobile device is configured such that upon a determination by said processor that said mobile device is moving, a moving mode of operation is activated wherein a secondary network interface device is operated simultaneously with a primary network interface device to recover missing packets from said primary network interface device.

23. The mobile device of claim 1, wherein said mobile device is configured such that upon determination by said processor that said mobile device is stationary, a stationary mode of operation is activated wherein a secondary network interface device is operated simultaneously with a primary network interface device to provide enhanced communication bandwidth when running certain applications on said mobile communication, and such that upon determination by said processor that said mobile device is moving, a moving mode of operation is activated wherein a secondary network interface device is operated simultaneously with a primary network interface device to recover missing packets from said primary network interface device.

24. The mobile device of claim 23, wherein said processor is configured to determine that said mobile device is stationary when the mobile device is almost stationary at a speed of less than one mile-per-hour.

25. The mobile device of claim 1, wherein said processor is configured to institute use of said plurality of network interface devices to enhance communication bandwidth based on said result of the determination of whether the mobile device is stationary or moving and is configured to institute use of said plurality of network interface devices to assist in packet loss recovery based on said result of the determination of whether the mobile device is stationary or moving, such that said mobile device varies use of said multiple interface devices between enhancing communication bandwidth and assisting in packet loss recovery based on a speed of the mobile device.

26. The mobile device of claim 1, wherein said network interface devices include a WLAN interface connecting to a WLAN, a first WAN interface connecting to a first WAN and a second WAN interface connecting to a second WAN.

27. A mobile device, comprising:
a plurality of network interface devices, each capable of connection to a wireless communication network; and
a processor that determines whether the mobile device is stationary or moving, and based on a result of the determination, institutes a mode of operation for said mobile device to use said plurality of network interface devices either to enhance communication bandwidth or to assist in packet loss recovery;
wherein said processor determines whether the mobile device is stationary or moving, and based on a result of the determination institutes a mode of operation, using a physical layer comparator and a network layer comparator, for said mobile device to use said plurality of network interface devices either to enhance communication bandwidth or to assist in packet loss recovery;
wherein said network layer comparator is configured to perform a comparison of packet streams received at the mobile device through multiple interfaces.

28. A mobile device, comprising:
a plurality of network interface devices, each capable of connection to a wireless communication network; and
a processor that determines whether the mobile device is stationary or moving, and based on a result of the determination, institutes a mode of operation for said mobile device to use said plurality of network interface devices either to enhance communication bandwidth or to assist in packet loss recovery:

wherein said processor determines whether the mobile device is stationary or moving, and based on a result of the determination institutes a mode of operation, using a physical layer comparator and a network layer comparator, for said mobile device to use said plurality of network interface devices either to enhance communication bandwidth or to assist in packet loss recovery;

wherein said physical layer comparator is configured to perform a comparison of multiple interfaces based on signal to noise ratio and/or signal strength, and wherein said network layer comparator is configured to perform a comparison of packet streams received at the mobile device through multiple interfaces.

* * * * *

UNITED STATES PATENT AND TRADEMARK OFFICE
CERTIFICATE OF CORRECTION

PATENT NO.        : 7,729,327 B2
APPLICATION NO.   : 11/531814
DATED             : June 1, 2010
INVENTOR(S)       : Yaqub It is certified that error appears in the above-identified patent and that said Letters Patent is hereby corrected as shown below:

On the Title Page, in Item (73), under "Assignees", in Column 1, Line 2, delete "Piscataway;" and insert -- Piscataway, NJ (US); --, therefor.

On the Title Page, in Item (73), under "Assignees", in Column 1, Line 3, delete "Piscataway" and insert -- Piscataway, NJ (US) --, therefor.

On the Title Page, in Item (56), under "OTHER PUBLICATIONS", in Column 2, Line 8, delete "Techical" and insert -- Technical --, therefor.

In the Claims

In Column 19, Line 3, in Claim 28, delete "recovery:" and insert -- recovery; --, therefor.

Signed and Sealed this
Eighteenth Day of November, 2014

Michelle K. Lee
*Deputy Director of the United States Patent and Trademark Office*